United States Patent
Sun et al.

(10) Patent No.: US 12,393,498 B2
(45) Date of Patent: Aug. 19, 2025

(54) HOT STORAGE BACKUP SYSTEM AND METHOD FOR SERVER

(71) Applicant: IEIT SYSTEMS CO., LTD., Shandong (CN)

(72) Inventors: Xiuqiang Sun, Shandong (CN); Jiaming Huang, Shandong (CN); Xiaobao Wang, Shandong (CN); Fanyi Yao, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/696,324

(22) PCT Filed: Jun. 30, 2022

(86) PCT No.: PCT/CN2022/102608
§ 371 (c)(1),
(2) Date: Mar. 27, 2024

(87) PCT Pub. No.: WO2023/155364
PCT Pub. Date: Aug. 24, 2023

(65) Prior Publication Data
US 2024/0394160 A1    Nov. 28, 2024

(30) Foreign Application Priority Data
Feb. 17, 2022   (CN) .......................... 202210144069.6

(51) Int. Cl.
*G06F 11/20*   (2006.01)
(52) U.S. Cl.
CPC .... *G06F 11/2094* (2013.01); *G06F 2201/805* (2013.01)
(58) Field of Classification Search
CPC ............... G06F 11/2094; G06F 13/428; G06F 2213/0016
See application file for complete search history.

(56) References Cited

U.S. PATENT DOCUMENTS

| | | | |
|---|---|---|---|
| 7,069,047 B2 | 6/2006 | Struhsaker et al. | |
| 10,977,205 B1 | 4/2021 | Qiu et al. | |
| 2013/0145052 A1* | 6/2013 | Aiken | G06F 9/4411 710/9 |

FOREIGN PATENT DOCUMENTS

| | | |
|---|---|---|
| CN | 101281452 A | 10/2008 |
| CN | 101702657 A | 5/2010 |

(Continued)

OTHER PUBLICATIONS

International Search Report and Written Opinion received for PCT Application No. PCT/CN2022/102608 dated Sep. 26, 2022 (14 pages including English Translation).

(Continued)

*Primary Examiner* — Michael Maskulinski
(74) *Attorney, Agent, or Firm* — Merchant & Gould P.C.

(57) ABSTRACT

A hot storage backup system and method for server, relating to the technical field of servers. The method includes: after a Complex Programming Logic Device (CPLD) in a hard disk backboard detects access of a hard disk, triggering a hard disk access signal and sending same to a Central Processing Unit (CPU), and sending command parameters, corresponding to the hard disk, combined by a Basic Input Output System (BIOS) to the CPU; and checking, by the CPU, the command parameters with a mapping table, and in the case that the check is successful, setting an Advanced Configuration and Power Management Interface (ACPI) protocol according to the command parameters, so that the server normally recognizes the hard disk, thereby implementing a hot storage backup function through the hard disk.

20 Claims, 5 Drawing Sheets

(56) References Cited

FOREIGN PATENT DOCUMENTS

| | | | |
|---|---|---|---|
| CN | 105955898 | A | 9/2016 |
| CN | 108304044 | A | 7/2018 |
| CN | 109032900 | A | 12/2018 |
| CN | 109144914 | A | 1/2019 |
| CN | 109669828 | A | 4/2019 |
| CN | 109933475 | A | 6/2019 |
| CN | 110389918 | A | 10/2019 |
| CN | 110543404 | A | 12/2019 |
| CN | 111190779 | A | 5/2020 |
| CN | 111274077 | A | 6/2020 |
| CN | 111538460 | A | 8/2020 |
| CN | 112306920 | A | 2/2021 |
| CN | 112463475 | A | 3/2021 |
| CN | 112579366 | A | 3/2021 |
| CN | 112667066 | A | 4/2021 |
| CN | 113138650 | A | 7/2021 |
| CN | 113656339 | A | 11/2021 |
| CN | 113742182 | A | 12/2021 |
| CN | 113760667 | A | 12/2021 |
| CN | 113868037 | A | 12/2021 |
| CN | 114185721 | A | 3/2022 |

OTHER PUBLICATIONS

Chinese Search Report received for CN Application No. 202210144069.6 (3 pages).
Liu Feng, et al., "Simple IDE Raid used in high-speed recording system", Systems Engineering and Electronics, 2004, 26:1, 4 pages including English Abstract).

\* cited by examiner

HOT STORAGE BACKUP SYSTEM AND METHOD FOR SERVER

CROSS-REFERENCE TO RELATED APPLICATION

This application is a Section 371 National Stage Application of International Application No. PCT/CN2022/102608, filed on Jun. 30, 2022, and which claims priority to Chinese patent application No. 202210144069.6, filed to the China National Intellectual Property Administration on Feb. 17, 2022 and the contents of which are incorporated herein by reference in its entirety.

TECHNICAL FIELD

The present disclosure relates to the technical field of servers, and in particular to a hot storage backup system and method for server.

BACKGROUND

With the continuous improvement of chip manufacturing processes, 5 nanometer (nm) chip technology has emerged. As a result, Advanced RISC Machine (ARM) chips and Advanced Micro Devices (AMD) processor chips all use chip manufacturing processes below 10 nm, which greatly improves the performance indicators of processor chips. Meanwhile, Intel chips still use chip manufacturing processes above 10 nm, which leads to performance comparisons between the three chips by end users of the chips. Inventors have realized that the performance of the ARM chips is superior to that of the Intel chips and the AMD processor chips in specific fields, and the ARM chips are sold at a lower price, so that the favor of Internet customers on the ARM chips is greatly increased, and meanwhile, the customer requirement for the functions of the ARM servers are also strengthened. Especially in batch and large-scale deployment of an Internet data center, the hot storage backup function of a large amount of data is extremely concerned and important, and the ARM chips have not yet supported the hot storage backup function, which leads to inability to meet the customer requirement, so that the ARM servers cannot be applied in large batches. Therefore, how to cause the ARM servers to support the hot storage backup function is a problem to be solved by those skilled in the art.

SUMMARY

The present disclosure provides a hot storage backup system for server, which includes: a hard disk, a hard disk backboard, and a Central Processing Unit (CPU). The CPU includes a chip of an ARM architecture.

After a Complex Programming Logic Device (CPLD) in the hard disk backboard detects access of the hard disk, a hard disk access signal is triggered and sent to the CPU, and command parameters, corresponding to the hard disk, combined by a Basic Input Output System (BIOS) are sent to the CPU.

The CPU is configured to check the command parameters with a mapping table, and set, in the case that the check is successful, an Advanced Configuration and Power Management Interface (ACPI) protocol according to the command parameters, so as to implement a hot storage backup function of the server through the hard disk.

In an embodiment, in the case that the hard disk is a Non-Volatile Memory Express (NVME) hard disk, the hard disk backboard is an NVME hard disk backboard.

In an embodiment, the hard disk is connected to the CPLD of the hard disk backboard through an Inter-Integrated Circuit (I2C) bus, and the CPLD is connected to the CPU through the I2C bus.

In an embodiment, the CPLD is In an embodiment configured to trigger an interrupt signal and send the interrupt signal to the CPU after detecting access of the hard disk.

In an embodiment, the command parameters include: location information of the hard disk, location information of the CPU, Peripheral Component Interconnect (PCI) bus information, PCI port information, I2C bus address information, and an I2C bus segment.

In an embodiment, the CPLD is further configured to confirm whether the hard disk can be normally used according to a command sent by the CPU.

In an embodiment, the hard disk is connected to the CPLD of the hard disk backboard through a General-Purpose Input/Output (GPIO) pin, and the CPLD is connected to the CPU through the GPIO pin.

In an embodiment, the command parameters include: a detection signal, the location information of the CPU, PCI bus information, a hard disk order, a hot restart signal, the I2C bus segment, and PCI subport information.

In an embodiment, the CPLD is further configured to perform a reset operation on the hard disk according to a reset command sent by the CPU.

The present disclosure further provides a hot storage backup method for server, which includes the following operations.

After a CPLD in a hard disk backboard detects access of a hard disk, a hard disk access signal is triggered and sent to a CPU, and command parameters, corresponding to the hard disk, combined by a BIOS are sent to the CPU. The CPU includes a chip of an ARM architecture.

The CPU checks the command parameters with a mapping table, and sets, in the case that the check is successful, an ACPI protocol according to the command parameters, so as to implement a hot storage backup function of the server through the hard disk.

The present disclosure further provides a server, including a memory and one or more processors. A computer readable instruction is stored in the memory. When executed by one or more processors, the computer readable instruction causes one or more processors to perform the steps of the hot storage backup method for the server.

The present disclosure last provides one or more non-transitory computer readable storage media storing computer readable instructions. When executed by one or more processors, the computer-readable instruction causes one or more processors to perform the steps of the hot storage backup method for the server.

Details of one or more embodiments of the present disclosure are given in the drawings and descriptions below. Other features and advantages of the present disclosure will become apparent from the description, the drawings and the claims.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

The technical solutions in embodiments of the present disclosure will be clearly and completely described below in conjunction with the drawings in the embodiments of the present disclosure. It is apparent that the described embodiments are only part of the embodiments of the present disclosure but not all of the embodiments. All other embodiments obtained by those ordinary skill in the art on the basis of the embodiments of the present disclosure without creative efforts are within the scope of protection of the present disclosure.

Embodiments of the present disclosure disclose a hot storage backup system and method for server, so as to cause the server to support a hot storage backup function.

Figure 1:
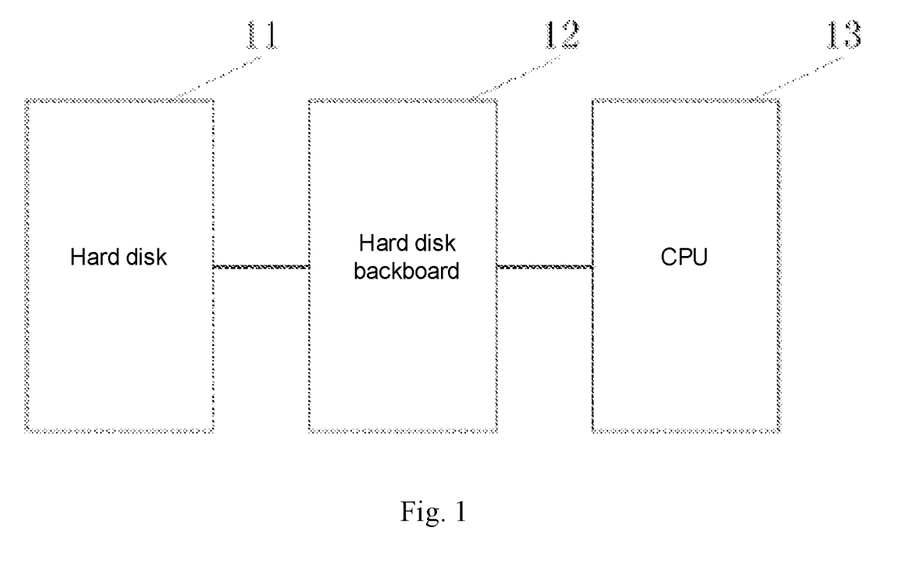
FIG. 1 is a schematic diagram of a hot storage backup system for server according to one or more embodiments of the present disclosure.

Referring to FIG. 1, which is a schematic diagram of a hot storage backup system for server provided by the embodiments of the present disclosure, the server includes: a hard disk 11, a hard disk backboard 12, and a CPU 13. The CPU 13 includes a chip of an ARM architecture.

After a CPLD in the hard disk backboard 12 detects access of the hard disk 11, a hard disk access signal is triggered and sent to the CPU 13, and command parameters, corresponding to the hard disk 11, combined by a BIOS are sent to the CPU 13.

The CPU 13 is configured to check the command parameters with a mapping table, and set, in the case that the check is successful, an ACPI protocol according to the command parameters, so as to implement a hot storage backup function of the server through the hard disk.

In an embodiment, the hard disk 11 may be an NVME hard disk, and accordingly, the hard disk backboard 12 is an NVME hard disk backboard, such as a 4-port NVME hard disk backboard. In addition, the hard disk backboard is provided with the CPLD. The CPLD is configured to receive and forward the command parameters combined by the BIOS. The command parameters are actual commands required and formed by the BIOS according to the location information of the hot storage backup hard disk that actually needs to be supported and related parameters, and are checked with the mapping table Multiple HP PCIe ports (MHPP), and in the case that the check is successful, the settings in the ACPI protocol are synchronized through the CPU 13, so as to support the hot storage backup function in an Operating System (OS).

That is, in the embodiment, after the access of the hard disk 11, the command parameters corresponding to the hard disk 11 may be sent to the CPU 13 through the CPLD, so as to set the ACPI. In this way, after the ARM server is powered on and enters the system, the hot storage backup function of the accessed NVME hard disk may be used by the NVEM hard disk backboard, which meets the requirement that the damaged NVME hard disk may be replaced at will in the system, the hot storage backup function is implemented through the hard disk, and the security and reliability of the data are ensured.

In an embodiment, the hard disk is connected to the CPLD of the hard disk backboard through an I2C bus, and the CPLD is connected to the CPU through the I2C bus.

In an embodiment, the ARM chip in the solution is physically connected to a PCI link slot of the CPU through the I2C bus, which is a simple bi-directional two-wire synchronous serial bus. The 4-port NVME hard disk backboard physically links the I2C bus in the PCI slot of the CPU to the I2C bus of the NVME hard disk through the I2C bus.

In addition, in the embodiment, the hard disk access signal is an Alert interrupt signal, that is, after the CPLD detects the access of the hard disk, the Alert interrupt signal is triggered and sent to the CPU. Through transmitting the Alert interrupt signal, it is informed that the hot storage backup function of the CPU has been triggered, and the CPLD also needs to receive and forward the data, so that the system may support the hot storage backup function in an I2C manner. The data transmitted through the I2C bus is the command parameters, and the command parameters include location information of the hard disk, location information of the CPU, PCI bus information, PCI port information, I2C bus address information, and an I2C bus segment.

Figure 2:
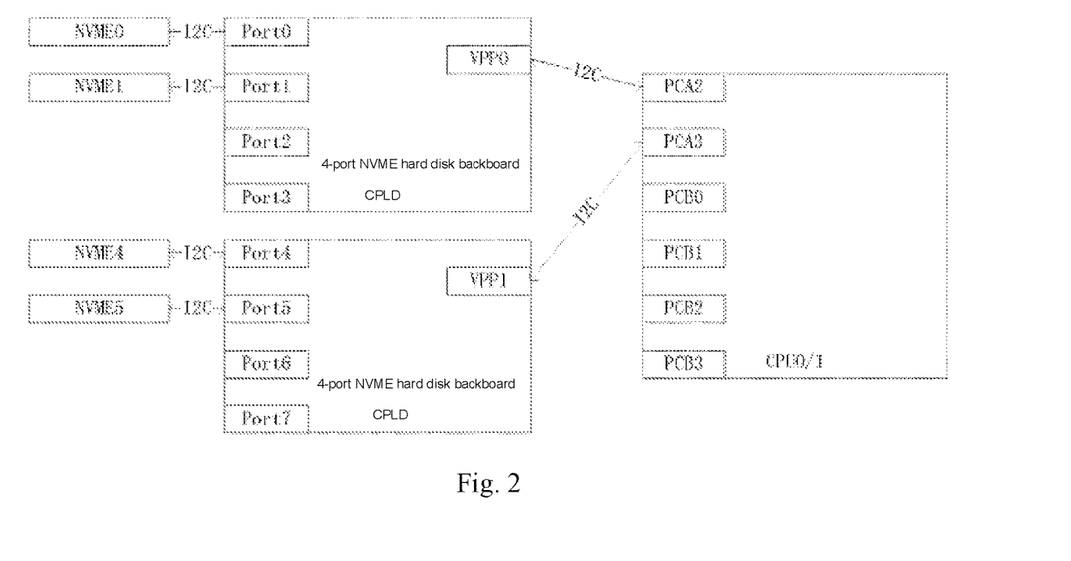
FIG. 2 is a schematic diagram of another hot storage backup system for server according to one or more embodiments of the present disclosure.

Referring to FIG. 2, which is a schematic diagram of another hot storage backup system for server provided by an embodiment of the present disclosure. In an embodiment, when the NVME hard disk is plugged and removed in a Port interface of the CPLD, the CPLD automatically generates the Alert interrupt signal and informs the CPU. Although the NVME hard disk generates the Alert interrupt signal when being plugged and removed, the information transmitted is different. The NVME hard disk transmits in-position information when being plugged, and the NVME hard disk transmits not-in-position information when being removed. In addition, the embodiment physically designs and links the I2C bus of the CPU to the PCI bus in the PCI slot (such as an RCA slot in FIG. 2) of the CPU, that is, the connection relationship of the hard disk, the CPLD, and the CPU is that: the hard disk is connected to the I2C of the CPLD of the hard disk backboard, the I2C of the CPLD is connected to the I2C of the RCA of the CPU, and the I2C of the RCA is connected to the I2C bus of the CPU.

In an embodiment, after setting the connection relationship, the I2C address of the PCI bus of the CPU needs to be provided for the CPLD, so that the CPLD converts the I2C address of the PCI bus of the CPU to the I2C address of the PCI bus that may determine the unique source, so as to provide the Alert interrupt signal for the CPU for informing the CPU that the hot storage backup function has been triggered. The I2C address of the PCI bus is A Virtual Pin Port (VPP) address of the CPLD, and the VPP address is an uplink port address of the CPLD, and is converted to the I2c address of the PCI bus that may determine the unique source, namely a downlink port address (Port0-Port3) of the CPLD, that is, when the CPLD detects that a Port is inserted into the hard disk to generate the Alert interrupt signal, the corresponding uplink port address may be converted according to an order of Port0 to Port3, so as to be sent to the corresponding CPU.

After the above settings, the connection relationship between the hardware has been specified. At this time, the BIOS may also write parameters according to the I2C address, an I2C channel, PCI bus port information, the number of NVME hard disks supported, a PCI bus segment and other information provided by the CPLD, and set parameters of the MHPP table. In an embodiment, the meaning of each parameter is as follows: the I2C address provided by the CPLD is the downlink port address (Port0 to Port3), the I2C channel is the number of the I2C bus used by the connection between the CPU and the CPLD, the PCI bus port information is the port number of the I2C bus connected between the CPU and the CPLD, and the PCI bus segment is a PCI link address range of the I2C bus connected between the CPU and the CPLD.

Figure 3:
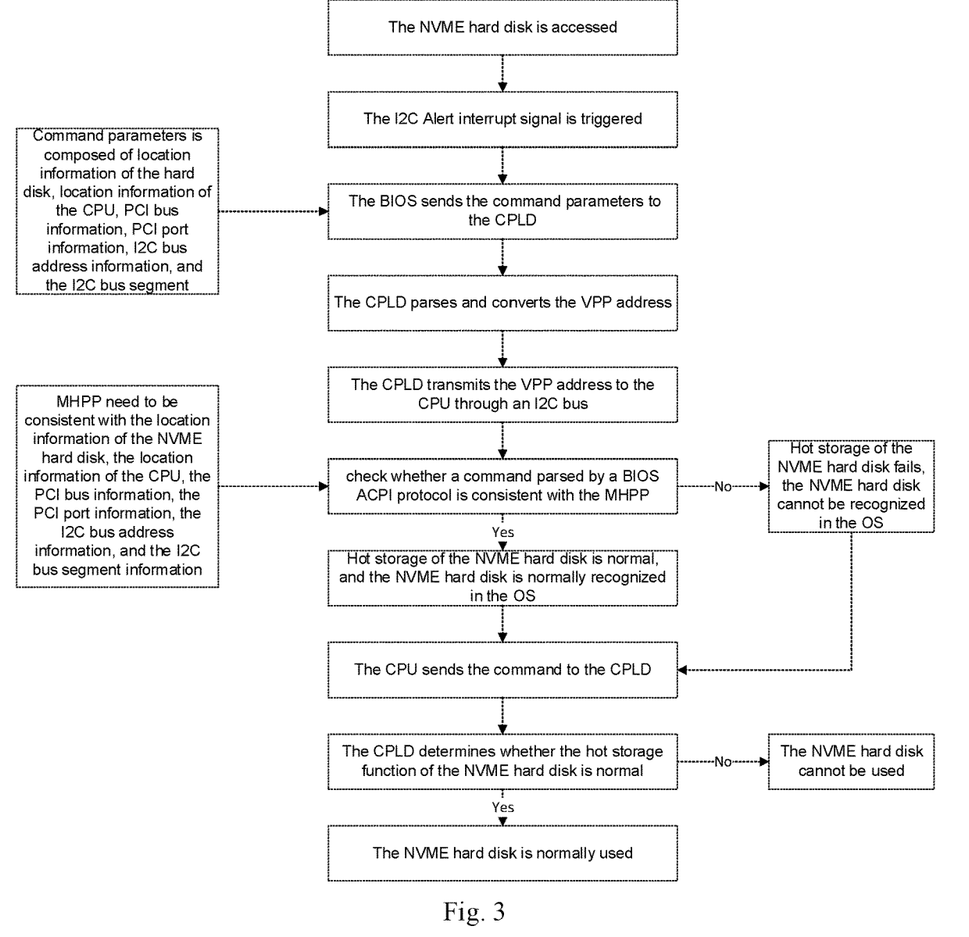
FIG. 3 is a flowchart for implementing a hot storage backup function according to one or more embodiments of the present disclosure.

Referring to FIG. 3, which is a flowchart for implementing a hot storage backup function provided by an embodiment of the present disclosure. It can be seen that when the CPLD detects the access of the NVME hard disk, the I2C Alert interrupt signal is triggered and sent to the CPU, and meanwhile, the CPLD sends the related information to the BIOS. The BIOS combines to generate the command parameters corresponding to the hard disk, determines the VPP address through the CPLD, and then sends the VPP address to the CPU through the I2C bus. The command parameters are composed of the location information of the hard disk, the location information of the CPU, the PCI bus information, the PCI port information, the I2C bus address information, and the I2C bus segment. The CPU receives the data sent by the CPLD and then checks the data with the MHPP table. In the case that the check is successful, it may be known where the hard disk is inserted. At this time, the parameters of a corresponding PCI port supporting the NVEM hot storage backup function need to be added in the ACPI protocol according to the command parameters, so that the NVME hard disk may be normally recognized in the OS. In the case that the check fails, it indicates that the hot storage function of the NVME hard disk fails, and the NVME hard disk cannot be recognized in the OS.

In addition, the CPLD in the solution is further configured to confirm whether the hard disk can be normally used according to a command sent by the CPU. That is, the CPU may send the command to the CPLD to control the CPLD to determine whether the hot storage function of the NVME hard disk is normal again, such as confirming whether the parameters of a PCI link support, in the case that the parameters of a PCI link support, the NVME hard disk may be normally recognized in the system, and the NVME hard disk may be normally used, and if the parameters of a PCI link don't support, the NVME hard disk may not be normally recognized in the system, and the NVME hard disk may not be normally used.

In summary, it can be seen that in the embodiment, the NVME hot storage backup function in the OS of the ARM server is implemented through the I2C bus and the I2C alert signal. The order of NVMEs connected to the NVME hard disk, the location of the CPU, the location of the PCI bus, the location information of the PCI port, the information of the PCI bus segment, the I2C address and other important location information are confirmed through the command parameters of the BIOS, so as to ensure that the NVME hard disk can be correctly recognized in the OS and the read and write function is normal, thereby meeting the requirement of an Internet data center for timely backup protection of data storage, improving the reliability and stability of the ARM server, providing an advantageous guarantee for the batch deployment of the data center server in the Internet data center, facilitating reducing the workload of the operation and maintenance personnel of the data center and providing the reliability of the data.

In an embodiment, the hard disk is connected to the CPLD of the hard disk backboard through a General-Purpose Input/Output (GPIO) pin, and the CPLD is connected to the CPU through the GPIO pin.

In an embodiment, an Input/Output (IO) expansion chip is arranged in the CPU, and the I2C bus of the ARM chip is physically linked to the IO expansion chip. Each IO expansion chip contains eight IO bidirectional input/output pins, namely the GPIO, which are set in an input state, namely a GPI state, by default. Meanwhile, these IO pins are physically linked to pins of the CPLD of the 4-port NVME hard disk backboard, and the pins of the CPLD are physically linked to ports of the NVME hard disk. Meanwhile, four GPIO reset signals of the CPU are also physically linked to a reset signal of the 4-port NVME hard disk backboard. When the pins of the CPLD of the 4-port NVME hard disk backboard detect that the GPIO pin with the hot storage function of the NVME hard disk is pulled down, it indicates that the hard disk is accessed. At this time, the generated hard disk access signal is fed back to the pins of the IO expansion chip physically linked to the I2C under the CPU, so that the CPU obtains the information that the hot storage function has been triggered and feeds same back to an ACPI code of the OS to set the parameters, so as to support the hot storage backup function, and when supported, the CPLD further performs the reset operation on the hard disk according to a reset command sent by the CPU, so as to inform the newly accessed NVME hard disk of performing hot reset through the reset signal of the CPU, thereby implementing the function.

Figure 4:
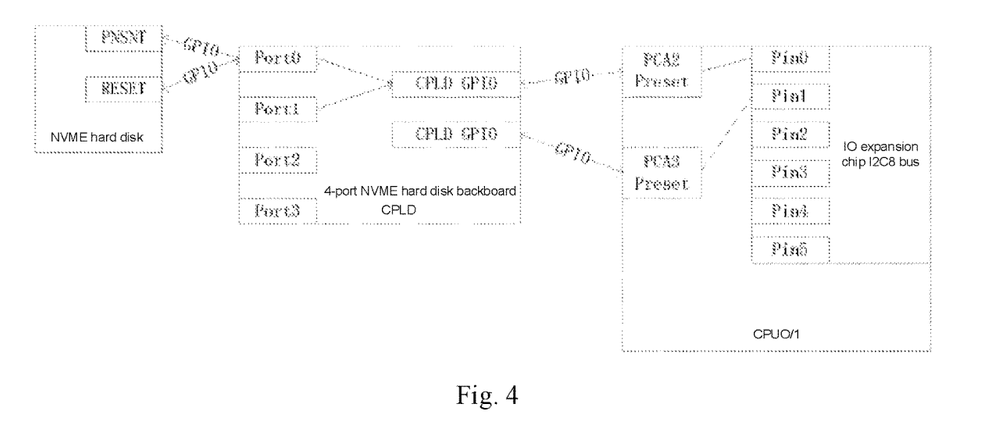
FIG. 4 is a schematic diagram of another hot storage backup system for server according to one or more embodiments of the present disclosure.

Referring to FIG. 4, which is a schematic diagram of another hot storage backup system for server provided by an embodiment of the present disclosure. In the embodiment, firstly, an IO expansion chip pin signal of the I2C bus of the CPU and the four GPIO reset signals of the CPU need to be physically linked to the pins of the CPLD of the 4-port NVME backboard at the same time, then the reset signals and a GPIO detection pin PRSNT are physically connected to interfaces of the NVME hard disk, and then parameters are written according to the GPIO detection pin, a reset pin signal of the NVME hard disk, the PCI bus port information of the CPU, the number of NVME hard disks supported, the PCI bus segment and other information provided by the CPLD, and the parameters of the MHPP table are set.

Figure 5:
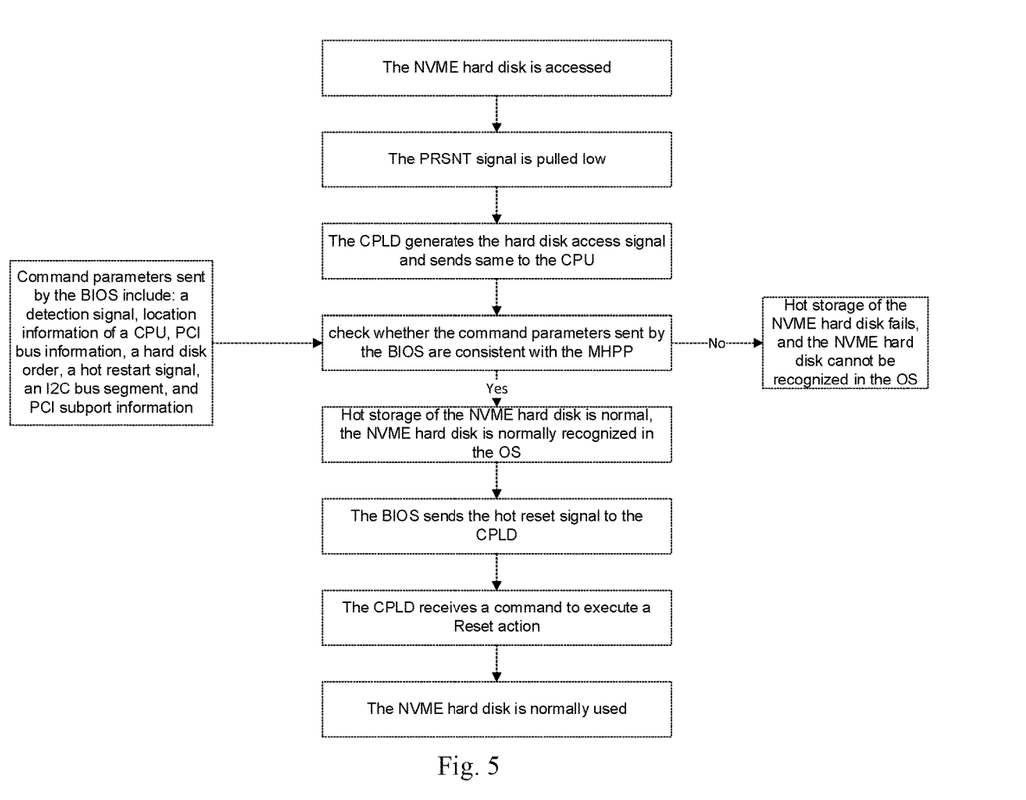
FIG. 5 is another flowchart for implementing a hot storage backup function according to one or more embodiments of the present disclosure.

Referring to FIG. 5, which is another flowchart for implementing a hot storage backup function provided by an embodiment of the present disclosure. It can be seen that after the access of the NVME hard disk, the PRSNNT signal is pulled low, at this time, the CPLD generates the hard disk access signal and sends the hard disk access signal to the CPU. Meanwhile, the CPLD sends the related information to the BIOS, and the BIOS combines to generate the command parameters corresponding to the hard disk. The command parameters include a detection signal (PRSNT signal), the location information of the CPU, the PCI bus information, a hard disk order, a hot restart signal (GPIO Reset signal), the I2C bus segment, and PCI subport information. The CPU receives the command parameters sent by the CPLD and then checks the command parameters with the MHPP table. In the case that the check is successful, it may be known where the hard disk is inserted. At this time, the parameters of the corresponding PCI port supporting the NVEM hot storage backup function need to be added in the ACPI protocol according to the command parameters, which indicates that the NVEM hot storage function is valid, and the reset signal is sent to the CPLD. The CPLD receives the command to execute a Reset action, at this time, the NVME hard disk may be normally recognized in the OS and used. In the case that the check fails, it indicates that the hot storage function of the NVME hard disk is invalid.

In summary, it can be seen that in the embodiment, the NVME hot storage backup function in the OS of the ARM server is implemented by connecting the I2C bus to the IO expansion chip and a CPLD logic chip. The order of NVMEs connected to the NVME hard disk, the location of the CPU, the location of the PCI bus, the location information of the PCI port, the information of the PCI bus segment, the PRSNT signal, the Reset hot reset signal and other important location information are confirmed through the command parameters of the BIOS, so as to ensure that the NVME hard disk can be correctly recognized in the OS and the read and write function is normal, thereby meeting the requirement of the Internet data center for timely backup protection of the data storage, implementing a batch protection backup solution supporting large-scale data in the OS, and providing reliability and stability for safe operation of the data center server. The solution belongs to the special characteristics of the ARM server, which provides an advantageous guarantee for the batch deployment of the ARM server in the Internet data center, facilitating reducing the workload of the operation and maintenance personnel of the data center and providing the reliability of the data.

A hot storage backup method provided by the embodiments of the present disclosure is described below, and the hot storage backup method described below and the hot storage backup system may be referred to each other.

Figure 6:
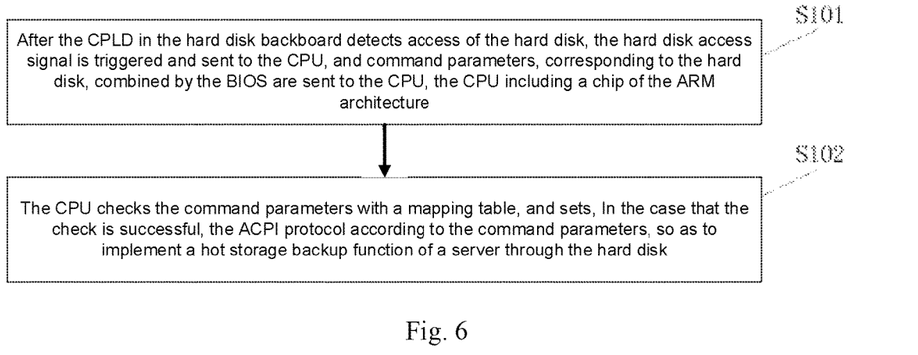
FIG. 6 is a schematic flowchart of a hot storage backup method for server according to one or more embodiments of the present disclosure.

Referring to FIG. 6, which is a schematic flowchart of a hot storage backup method for server according to an embodiment of the present disclosure. Taking the disclosure of the method to a server as an example, the method includes:

At S101, After a CPLD in a hard disk backboard detects the access of a hard disk, a hard disk access signal is triggered and sent to a CPU, and command parameters, corresponding to the hard disk, combined by a BIOS are sent to the CPU. The CPU includes a chip of an ARM architecture.

At S102, the CPU checks the command parameters with a mapping table, and sets, in the case that the check is successful, an ACPI protocol according to the command parameters, so as to implement a hot storage backup function of the server through the hard disk.

In the case that the hard disk is an NVME hard disk, the hard disk backboard is an NVME hard disk backboard.

The hard disk is connected to the CPLD of the hard disk backboard through an I2C bus, and the CPLD is connected to the CPU through the I2C bus. The command parameters include: location information of the hard disk, location information of the CPU, PCI bus information, PCI port information, I2C bus address information, and an I2C bus segment.

The CPLD triggers an interrupt signal and send same to the CPU after detecting the access of the hard disk. It is confirmed whether the hard disk can be normally used according to a command sent by the CPU.

The hard disk is connected to the CPLD of the hard disk backboard through a GPIO pin, and the CPLD is connected to the CPU through the GPIO pin. The command parameters include: a detection signal, the location information of the CPU, the PCI bus information, a hard disk order, a hot restart signal, the I2C bus segment, and PCI subport information.

The CPLD performs a reset operation on the hard disk according to a reset command sent by the CPU.

In summary, it can be seen that in the embodiment, after the access of the hard disk, the command parameters corresponding to the hard disk may be sent to the CPU through the CPLD, so as to set the ACPI protocol. In this way, after the ARM server is powered on and enters the system, the hot storage backup function of the used NVME hard disk may be used by using the NVEM hard disk backboard, which meets the requirement that the damaged NVME hard disk may be replaced at will in the system to ensure the security and reliability of the data, thereby implementing the hot storage backup function through the hard disk.

Figure 7:
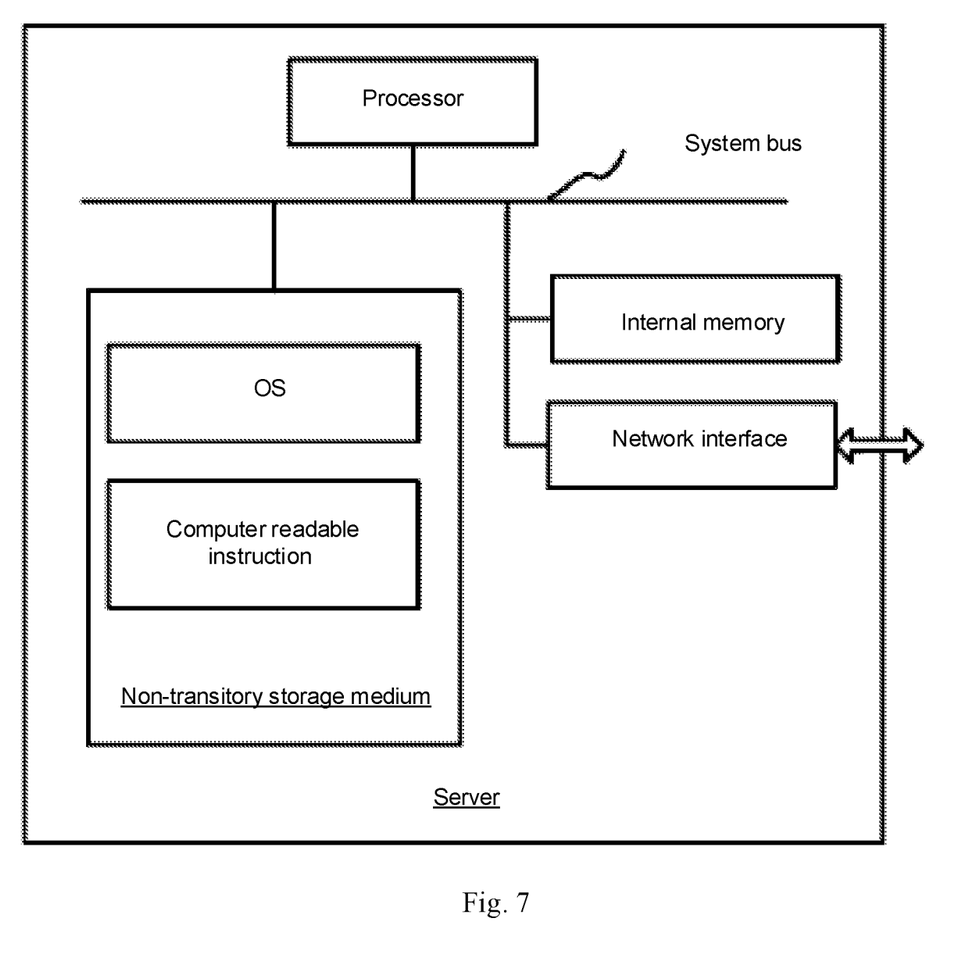
FIG. 7 is a schematic diagram of an internal structure of a server according to one or more embodiments of the present disclosure.

In an embodiment, a server is provided, and a diagram of an internal structure thereof may be as shown in FIG. 7 is provided. A computer device includes a processor, a memory, and a network interface which are connected through a system bus. The processor of the computer device is configured to provide computing and control capabilities. The memory of the computer device includes a non-transitory storage medium and an internal memory. The non-transitory storage medium stores an operating system and a computer readable instruction. The internal memory provides an environment for the operation of the operating system and the computer readable instruction in the non-transitory storage medium. The network interface of the computer device is configured to communicate with an external terminal through a network connection. The computer readable instruction is executed by the processor to implement a hot storage backup method for the server. In one embodiment, a non-transitory computer readable storage medium is provided. The non-transitory computer readable storage medium stores a computer readable instruction, when executed by one or more processors, the computer readable instruction causes one or more processors to perform the steps of the above hot storage backup method for the server.

Those of ordinary skill in the art may understand that implementation of all or part of the processes in the embodiment method may be completed by instructing related hardware through the computer readable instruction, and the computer readable instruction may be stored in the non-transitory computer readable storage medium. The computer readable instruction, when executed, may include the processes of the embodiments of the above methods. Any reference to a memory, a storage, a database, or another medium used in the embodiments provided by the present disclosure may include a non-transitory and/or volatile memory. The non-transitory memory may include a Read Only Memory (ROM), a Programmable ROM (PROM), an Electrically EROM (EPROM), an Electrically Erasable PROM (EEPROM), or a flash memory. The volatile memory may include a Random Access Memory (RAM) or an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Direct Rambus RAM (RDRAM), a Direct Rambus DRAM (DRDRAM), a Rambus DRAM (RDRAM), etc.

The technical features of the above described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of several implementations of the present disclosure with specific and detailed description, and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A hot storage backup system for server, comprising: a hard disk, a hard disk backboard, and a Central Processing Unit (CPU), the CPU comprises a chip of an Advanced RISC Machine (ARM) architecture;
wherein after a Complex Programming Logic Device (CPLD) in the hard disk backboard detects access of the hard disk, a hard disk access signal is triggered and sent to the CPU, and command parameters, corresponding to the hard disk, combined by a Basic Input Output System (BIOS) are sent to the CPU; and
the CPU is configured to check the command parameters with a mapping table, and set, in a case that the check is successful, an Advanced Configuration and Power Management Interface (ACPI) protocol according to the command parameters, so as to implement a hot storage backup function of the server through the hard disk.

2. The hot storage backup system according to claim 1, wherein in a case that the hard disk is a Non-Volatile Memory Express (NVME) hard disk, the hard disk backboard is an NVME hard disk backboard.

3. The hot storage backup system according to claim 1, wherein the hard disk is connected to the CPLD of the hard disk backboard through an Inter-Integrated Circuit (I2C) bus, and the CPLD is connected to the CPU through the I2C bus.

4. The hot storage backup system according to claim 3, wherein the CPLD is configured to trigger an interrupt signal and send the interrupt signal to the CPU after detecting the access of the hard disk.

5. The hot storage backup system according to claim 3, wherein the command parameters comprise: location information of the hard disk, location information of the CPU, Peripheral Component Interconnect (PCI) bus information, PCI port information, I2C bus address information, and an I2C bus segment.

6. The hot storage backup system according to claim 3, wherein the CPLD is further configured to confirm whether the hard disk can be normally used according to a command sent by the CPU.

7. The hot storage backup system according to claim 1, wherein the hard disk is connected to the CPLD of the hard disk backboard through a General-Purpose Input/Output (GPIO) pin, and the CPLD is connected to the CPU through the GPIO pin.

8. The hot storage backup system according to claim 7, wherein the command parameters comprise: a detection signal, location information of the CPU, PCI bus information, a hard disk order, a hot restart signal, I2C bus segment, and PCI subport information.

9. The hot storage backup system according to claim 7, wherein the CPLD is further configured to perform a reset operation on the hard disk according to a reset command sent by the CPU.

10. A hot storage backup method for server, comprising:
after a Complex Programming Logic Device (CPLD) in a hard disk backboard detects access of a hard disk, triggering a hard disk access signal and sending the hard disk access signal to a Central Processing Unit (CPU), and sending command parameters, corresponding to the hard disk, combined by a Basic Input Output System (BIOS) to the CPU, the CPU comprises a chip of an Advanced RISC Machine (ARM) architecture; and
checking, by the CPU, the command parameters with a mapping table, and in a case that the check is successful, setting an Advanced Configuration and Power Management Interface (ACPI) protocol according to the command parameters, so as to implement a hot storage backup function of the server through the hard disk.

11. A non-transitory computer readable storage media storing computer-readable instructions, when executed by one or more processors, the computer-readable instruction causing one or more processors to perform the steps of the method according to claim 10.

12. The hot storage backup method according to claim 10, wherein in a case that the hard disk is a Non-Volatile Memory Express (NVME) hard disk, the hard disk backboard is an NVME hard disk backboard.

13. The hot storage backup method according to claim 10, wherein in a case that the hard disk is connected to the CPLD of the hard disk backboard through an I2C bus, and the CPLD is connected to the CPU through the I2C bus, the command parameters comprise: location information of the hard disk, location information of the CPU, PCI bus information, PCI port information, I2C bus address information, and an I2C bus segment.

14. The hot storage backup method according to claim 10, wherein in a case that the hard disk is connected to the CPLD of the hard disk backboard through a GPIO pin, and the CPLD is connected to the CPU through the GPIO pin, the command parameters comprise: a detection signal, location information of the CPU, PCI bus information, a hard disk order, a hot restart signal, I2C bus segment, and PCI subport information.

15. The hot storage backup method according to claim 10, after detecting the access of the hard disk, further comprising:
triggering, by the CPLD, an interrupt signal, and sending the interrupt signal to the CPU.

16. The hot storage backup method according to claim 10, further comprising:
confirming, by the CPLD, whether the hard disk can be normally used according to a command sent by the CPU.

17. The hot storage backup method according to claim 16, wherein confirming, by the CPLD, whether the hard disk can be normally used according to a command sent by the CPU, comprising:
confirming, by the CPLD, whether the hot storage backup function of an NVME hard disk is normal.

18. The hot storage backup method according to claim 10, further comprising:

performing, by the CPLD, a reset operation on the hard disk according to a reset command sent by the CPU.

19. The hot storage backup method according to claim 18, wherein performing, by the CPLD, a reset operation on the hard disk according to a reset command sent by the CPU comprises:

informing, by the CPLD, a newly accessed NVME hard disk to perform hot reset through the reset command.

20. A server, comprising a memory and one or more processors, wherein a computer-readable instruction is stored in the memory, and when executed by one or more processors, the computer-readable instruction causes one or more processors to perform a method comprising:

after a Complex Programming Logic Device (CPLD) in a hard disk backboard detects access of a hard disk, trigger a hard disk access signal and send the hard disk access signal to a Central Processing Unit (CPU), and send command parameters, corresponding to the hard disk, combined by a Basic Input Output System (BIOS) to the CPU, the CPU comprises a chip of an Advanced RISC Machine (ARM) architecture; and check, by the CPU, the command parameters with a mapping table, and in a case that the check is successful, set an Advanced Configuration and Power Management Interface (ACPI) protocol according to the command parameters, so as to implement a hot storage backup function of the server through the hard disk.

* * * * *